Patented May 4, 1926.

1,582,888

UNITED STATES PATENT OFFICE.

THOMAS W. ANDERSON, OF LITTLE ROCK, ARKANSAS.

WOOD-FINISHING MATERIAL.

No Drawing. Original application filed January 15, 1925, Serial No. 2,690. Divided and this application filed July 22, 1925. Serial No. 45,422.

*To all whom it may concern:*

Be it known that I, THOMAS W. ANDERSON, a citizen of the United States and resident of Little Rock, in the county of Pulaski and State of Arkansas, have invented certain new and useful Improvements in Wood-Finishing Materials, of which the following is a specification.

There are at the present time various types of materials for treating and finishing wood. Wood fillers are commonly used to partially fill the interstices of the wood to a greater or less depth for the purpose of rendering fireproof or resistant to the action of moisture or as a preliminary treatment when it is desired to finish the surface by subsequent operations. Varnishes are used to give a high gloss or for decorative or imitative purposes, and the use of a wood filler is generally followed by the use of a varnish. Paints are different from varnishes, and are more generally used for protective purposes alone with no further decorative effect than follows the employment of a definite color scheme.

The material forming the subject of my invention differs from all of the above enumerated types of materials in two principal ways. In the first place, it is neither a filler, varnish nor paint, although having some of the characteristics of each. In the second place, it is not a mere mechanical mixture, but involves certain chemical reactions which are none the less present because difficult to define or explain.

The invention herein claimed is a division of my application Serial No. 2,690, filed January 15, 1925 and is limited to the material. In view however, of the intimate relation between the material and the process of application, it is believed to describe both in the present case.

The basis of my material is linseed oil. My material is a solid substance, produced by exposing linseed oil to chemical oxidation and catalytic action.

The oxidizing and catalyzing agent is finely pulverized aluminum silicate of about the following metallic contents: Alumina, 27.79%; iron sesquioxide, 4.81%; titanium oxide, 1.40%.

The oxides may not be essential to the chemical reaction, and in some cases may be considered as impurities, but nevertheless when produced by the use of a silicate of this type, my material is highly successful.

The finely pulverized silica appears either to be, or to contain, both an oxidizing and a catalytic agent. When linseed oil is brought into contact with the finely pulverized silica, the oil becomes a solid substance of about the density of dry flake glue. It is pliant, translucent, takes a high polish under friction, and is remarkably resistant to abrasion.

In order to finish wood with this material, it is necessary that the above recited reaction and its resultant transformation of the oil shall take place after the oil has penetrated and filled the pores and interstices of the wood.

To accomplish that purpose, the finely powdered silica is applied to the surface of the wood. An amply sufficient amount of it will cling to the wood. On small objects it is best applied with a cloth (as talcum powder is applied) but on large surfaces such as hardwood floors, it is simply scattered over the space and then swept across and off of the surface with a hair brush or broom. One pound of the pulverized silica is sufficient to apply to three hundred square feet of surface.

In order to apply the oil rapidly and evenly, and with best results, it is thinned with turpentine. The turpentine is not a part of the material that remains in the wood as finish material, but is used only to thin that material, and facilitate its application.

One quart of linseed oil should be applied to three hundred square feet of surface. Before applying the quart of oil, it should be thinned by the addition of two quarts of turpentine. This can be applied with a brush or an atomizer such as is used to apply other wood-finishing material.

In about thirty minutes after applying the oil, the turpentine will have mostly evaporated. The oil then remaining on the surface should be thoroughly rubbed in with a handful of cotton waste or a piece of burlap. This is best done with a spiral motion. In not less than four hours, nor more than ten hours after application, all surplus material must be wiped from the surface of the wood. This surface material will consist of practically all of the silica, and of such portion of the oil as has not been absorbed by the wood. This cleaning off of surplus material is necessary because the finish is not only less pleasing in appearance, but is less durable, if a coating of the material is permitted to remain upon the surface of the wood. The cleaning off should not be done in less than four hours after application, because during that length of time the presence of the catalytic and oxidizing agent is required to insure the reaction which causes the transformation of the oil into the solid substance heretofore described. The cleaning off process must not be deferred longer than ten hours, because after that length of time transformation of the oil has progressed to an extent which makes the cleaning off process difficult, or impracticable.

In thirty-six hours after application, the chemical action will be sufficiently complete to enable the surface to be polished with a cloth or brush.

The result of the treatment of wood with the material specified is to impregnate the fibres thereof with a substance which renders the same waterproof and is protective in other ways. It will take a high degree of polish and being translucent does not destroy or obscure the natural grain of the wood. Since the material becomes hard it not only takes a beautiful finish but is resistant to abrasive action to a much higher degree than is the usual varnish.

My invention thus obviates the use of a wood filler with a following application of varnish or paint, and also obtains all of the advantages produced by such treatment together with other advantages not obtained by the use of wood filler and varnish together or by either alone.

While I have disclosed my invention in its preferred form, it is obvious that it is not limited to the precise proportions set forth since variations can be made without in any way departing from the spirit of the invention which is to be regarded as limited only by the scope of the appended claim.

I claim as my invention:

A wood finishing material produced by the oxidation and catalyzation of linseed oil by finely powdered aluminum silicate containing about 28% alumina, 1.4% titanium oxide and 4.8% iron sesquioxide.

In testimony whereof, I have hereunto subscribed my name.

THOMAS W. ANDERSON.